UNITED STATES PATENT OFFICE.

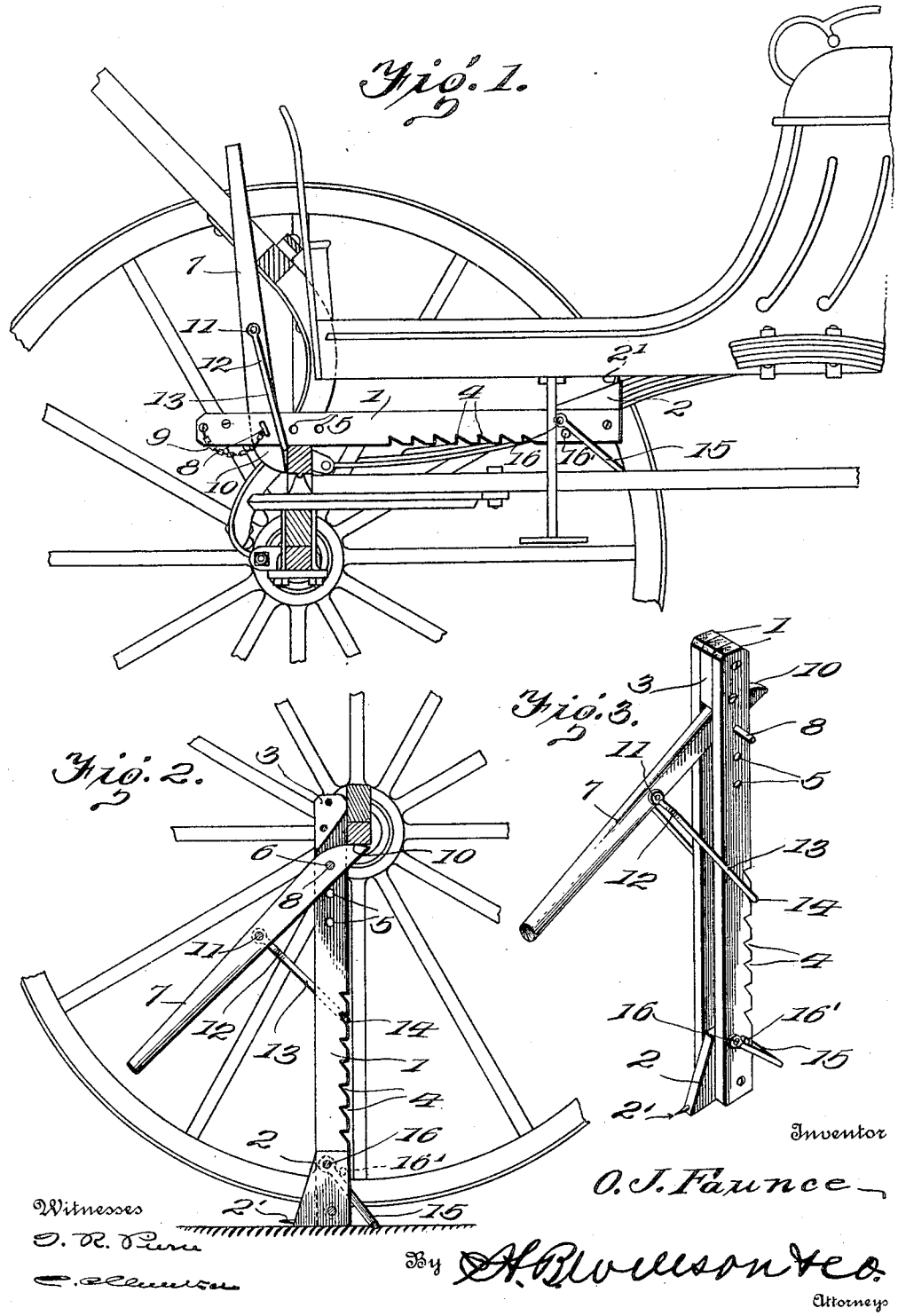

OLIN J. FAUNCE, OF GRANTHAM, NEW HAMPSHIRE.

COMBINED JACK AND THILL-SUPPORT.

1,134,377.  Specification of Letters Patent.  Patented Apr. 6, 1915.

Application filed February 9, 1914. Serial No. 817,625.

*To all whom it may concern:*

Be it known that I, OLIN J. FAUNCE, a citizen of the United States, residing at Grantham, in the county of Sullivan and State of New Hampshire, have invented certain new and useful Improvements in Combined Carriage-Jacks and Thill-Supports; and I do declare the following to be a full, clear, and exact description of the invention, such as will enable others skilled in the art to which it appertains to make and use the same.

This invention is a combined carriage jack and thill support and has for its object to provide a simply constructed device which may be used to equal advantage as a carriage or wagon jack and as a support for holding the thills of a carriage or buggy in raised position.

With the above object in view, the invention resides in certain novel features of construction and combination herein described and claimed and shown in the drawings wherein:

Figure 1 is a side view partly in section of a portion of a buggy showing the application of my invention as a thill support. Fig. 2 is a vertical sectional view of the device showing it employed as a lifting jack; and Fig. 3 is a detail perspective view of the device.

In the embodiment illustrated, I have shown my combined carriage jack and thill support as comprising parallel side bars 1 which are rigidly secured to the opposite sides of a substantially triangular base block or foot 2, their upper ends being rigidly secured to the opposite sides of a spacing or head block 3. The lower end of the block 3 is preferably inclined downwardly and forwardly. The lower portions of the side bars 1 are provided with pluralities of teeth 4, while the upper portions of said bars are provided with alined openings 5.

Projecting removably through the openings 5 and through an opening 6 in a hand lever 7, is a pivot pin 8 which is preferably connected to one of the side bars by means of a flexible connection 9. The forward upper end of the lever 7 is rounded as at 10 to allow it to slide readily beneath a vehicle axle when the latter, when being raised, contacts with the forward edges of the bars 1. Pivoted at 11 to the opposite sides of the lever 7 is a substantially U-shaped yoke which has its end portions bent inwardly as at 12, its side arms 13 and its cross bar 14 embracing the side bars 1 and said cross bar 14 co-acting with the teeth 4 in a manner to appear. The arms 13 are of such a length as to position the cross bar 14 in position to contact with the forward edges of the bars 1 and the lower side of the lever 7, when said lever is swung to substantially right angular relation in respect to said side bars. (See Fig. 1). When in this position, one edge of said lever will contact with the head block 3 and will thus assist in retaining the lever in position.

I preferably employ a U-shaped brace 15 which is pivoted at 16 to the opposite side bars 1, said brace co-acting with the foot 2 to support the bars 1 in upright position when the device is used as a carriage jack, upward movement of said link being prevented by pin 16'.

When it is desired to use the invention as a carriage jack, the pin 8 may be adjusted to the proper height by engagement with certain of the openings 5, the rounded outer end of the lever 7 may then be placed beneath the axle to be raised and the brace 15 may be swung outwardly for the above mentioned purpose. The rear end of the lever 7 may now be depressed which action will raise the forward end thereof and also the axle resting upon said end. This descent of the rear portion of the lever will cause the yoke to descend and its cross bar 14 will engage the notches 4 and will retain the lever in this position when pressure is released from its inner end. The operation, for which the axle was raised, may now be completed, whereupon said axle may again be lowered to its original position.

When it is desired to use the invention for supporting the thills of a carriage or buggy, the bars 1 may be turned to a substantially horizontal position and the foot 2 inserted between the body of the vehicle and the supporting means carried by the axle thereof. The lever 7 may now be engaged with the cross bar connecting the thills, and when in this position, the cross bar 14 of the yoke will, as above stated, contact with what is now the inner side of the lever 7 and the under sides of the bars 1. The foot 2 is preferably provided with a prong 2' which is adapted to bite into the under side of the floor of the vehicle when the device is used for the purpose of supporting the thills.

From the above description, it will be seen that my invention is adjustable for axles of different height and, no matter to what extent it is adjusted, it will be readily applicable as a thill support.

I consider the combination of the two (jack and thill support) a very important feature, since the one article answers a twofold purpose.

I may here explain that although, at a glance, it would seem that the openings 5 and the removable pin 8 were only employed when the device is used as a jack, this construction becomes expedient when merely employing the device for supporting the thills of a vehicle, since if the block 2 be provided with a prong 2′ or be constructed in any manner to prevent its slipping, such construction will, after excessive use, greatly mutilate the floor of the vehicle body, thereby weakening the same. By allowing the lever to be adjusted longitudinally between the two bars 1, however, when mutilation of the floor by the action above described is apparent, the lever may be adjusted to a point between two more openings, thereby causing the prong 2′ or other antislipping device, to engage a different portion of the bottom. It will, therefore, be seen that it is impossible to wear openings through the bottom of the body, if care is taken in manipulating and adjusting the device when used as a thill support.

Having thus described my invention, what I claim as new and desire to secure by Letters Patent is:

A device of the character described comprising a pair of horizontal transversely spaced side bars designed to be inserted between the body of a vehicle and above the front axle thereof, spacing blocks between the opposite ends of said side bars, one block being extended upwardly to contact with the floor of the vehicle body, said bars having a series of transversely alined openings, an upright lever having its lower end inserted between and depending below said bars, the upper end of said lever being designed to contact with the cross bar of a pair of thills when the latter is raised, a removable pin projecting through certain of said openings and through said lower end of the lever and a U-shaped yoke having its cross bar contacting with the inner edge of the depending end of the lever and with the adjacent lower edges of the side bars, the arms of said yoke embracing said side bars and being pivoted to the opposite sides of the lever at a point above said removable pin.

In testimony whereof I have hereunto set my hand in presence of two subscribing witnesses.

O. J. FAUNCE.

Witnesses:
Geo. E. Lewis,
Sam D. Lewis.

Copies of this patent may be obtained for five cents each, by addressing the "Commissioner of Patents, Washington, D. C."